(12) United States Patent
Clements

(10) Patent No.: US 7,186,284 B2
(45) Date of Patent: *Mar. 6, 2007

(54) FILTER MOUNTING SYSTEM

(75) Inventor: Jack Thomas Clements, Lee's Summit, MO (US)

(73) Assignee: BHA Group, Inc., Kansas City, MO (US)

(*) Notice: Subject to any disclaimer, the term of this patent is extended or adjusted under 35 U.S.C. 154(b) by 301 days.

This patent is subject to a terminal disclaimer.

(21) Appl. No.: 10/778,487

(22) Filed: Feb. 13, 2004

(65) Prior Publication Data

US 2005/0178097 A1 Aug. 18, 2005

(51) Int. Cl.
*B01D 29/17* (2006.01)

(52) U.S. Cl. ............... 55/377; 55/378; 55/341.1; 55/508; 55/374; 55/376; 55/509; 55/DIG. 26; 95/273

(58) Field of Classification Search ............ 55/377, 55/378, 341.1, 508, 374, 376, 509, DIG. 26, 55/95; 95/273
See application file for complete search history.

(56) References Cited

U.S. PATENT DOCUMENTS

| | | | |
|---|---|---|---|
| 2,308,310 A * | 1/1943 | Ruemelin, Jr. et al. . 285/148.13 |
| 4,042,356 A * | 8/1977 | Miller ...................... 55/341.1 |
| 4,266,954 A * | 5/1981 | Oare et al. ............... 55/341.1 |
| 4,272,263 A * | 6/1981 | Hancock ..................... 55/377 |
| 4,291,904 A * | 9/1981 | Iversen et al. ........... 285/140.1 |
| 4,292,057 A * | 9/1981 | Ulvestad et al. ............ 55/302 |
| 4,306,893 A * | 12/1981 | Fernando et al. ............ 55/302 |
| 4,344,718 A * | 8/1982 | Taylor ...................... 403/287 |
| 4,345,924 A * | 8/1982 | Margraf ..................... 55/379 |
| 4,424,070 A | 1/1984 | Robinson |
| 4,436,536 A | 3/1984 | Robinson |
| 4,443,237 A | 4/1984 | Ulvestad |
| 4,445,915 A | 5/1984 | Robinson |
| 5,061,303 A * | 10/1991 | Williams et al. ........... 55/341.1 |
| 5,632,791 A | 5/1997 | Oussoren et al. |
| 5,730,766 A * | 3/1998 | Clements .................. 55/341.1 |
| 5,746,792 A * | 5/1998 | Clements et al. .......... 55/341.1 |
| 5,785,724 A * | 7/1998 | Johnson ...................... 55/377 |
| 5,964,909 A * | 10/1999 | Brunner ...................... 55/377 |
| 6,299,662 B1 * | 10/2001 | Poulsen ....................... 55/498 |

(Continued)

OTHER PUBLICATIONS

Kleisser Company Operating and Maintenance Manual.

*Primary Examiner*—Minh-Chau T. Pham
(74) *Attorney, Agent, or Firm*—Greg Strugalski

(57) ABSTRACT

A filter mounting system for use in a baghouse having a tubesheet with a plurality of openings. The filter mounting system includes filter media and a tubular mounting collar attached to the filter media to mount the filter media relative to the tubesheet. The filter mounting system also includes a gasket made of a flexible material. The gasket has a tubesheet receiving portion and a filter receiving portion extending from the tubesheet receiving portion. The mounting collar of the filter mounting system is adapted to be positioned within the filter receiving portion of the gasket and engaging the filter receiving portion to effect sealing engagement of the tubesheet receiving portion of the gasket against a portion of the tubesheet adjacent the opening. The filter receiving portion extends from the tubesheet receiving portion to force one portion of the gasket into sealing engagement with a surface of the tubesheet upon engagement with the mounting collar.

33 Claims, 11 Drawing Sheets

U.S. PATENT DOCUMENTS

| | | | |
|---|---|---|---|
| 6,579,348 B1 * | 6/2003 | Winter et al. | 95/273 |
| 6,706,087 B1 * | 3/2004 | Gebler et al. | 55/492 |
| 6,726,735 B1 * | 4/2004 | Oussoren et al. | 55/377 |
| 6,858,052 B1 * | 2/2005 | Clements | 55/377 |
| 2004/0237483 A1 * | 12/2004 | Clements | 55/341.1 |
| 2005/0055989 A1 * | 3/2005 | Morgan | 55/379 |

* cited by examiner

FILTER MOUNTING SYSTEM

BACKGROUND OF THE INVENTION

1. Technical Field

The present invention is generally directed to a filter assembly for use in a dust collector. In particular, the present invention is directed to a filter cartridge structure and apparatus for mounting and supporting the filter cartridge in the dust collector.

2. Description of the Prior Art

Dust collectors, such as baghouses, for filtering particulate-laden air are well known. A typical baghouse has a housing with a dirty air chamber and a clean air chamber. The two chambers are separated by sheet metal, commonly referred to as a tubesheet. The tubesheet has a number of openings through which cylindrical filters, such as bags or cartridges, typically extend. The filters are suspended by the tubesheet and extend into the dirty air chamber. Particulate-laden air is introduced into the dirty air chamber. The air passes through the filters and through the openings in the tubesheet into the clean air chamber. The particulates are separated from the air flow by the filters. The filtered air is exhausted from the clean air chamber or directed for other uses.

Important in the design of a filter bag or filter cartridge and associated support structure is that a good seal must exist between the filter and the supporting tubesheet. If a good seal does not exist, particulate-laden air may leak around the filter, through the tubesheet opening and into the clean air chamber. This leakage results in the undesirable situation of having particulate-laden air in the clean air chamber.

Numerous attempts have been made to develop a baghouse filter and support structure for attaching a filter element to a baghouse tubesheet. U.S. Pat. Nos. 4,292,057; 4,424,070; 4,436,536; 4,443,237 and 4,445,915 are representative examples of prior art filter elements and attachment structure. U.S. Pat. No. 5,632,791 discloses a flexible sleeve molded from relatively soft urethane material that directly engages a surface defining an opening in the tubesheet. U.S. Pat. No. 5,746,792 discloses a metal mounting collar that is engagable with a flexible snapband for sealing against a tubesheet.

In spite of significant efforts at solving the problems and disadvantages with prior art filters, the prior art filters and associated support structure tend to be complex, which adds to the cost of the filter and installation in the baghouse. The prior art filters also have not been altogether satisfactory in preventing particulate-laden air from leaking from the dirty air chamber, through the tubesheet opening, and into the clean air chamber. The mounting and sealing of filters within a baghouse tubesheet remains one of the most time-consuming and expensive operations in the manufacture of baghouses and in the replacement of filters.

U.S. patent application Ser. No. 10/448,693 discloses a filter cartridge and support structure for use in a baghouse having a tubesheet with openings. A flexible snapband with a metal spring component and fabric cover is biased into engagement with a surface of the opening in the tubesheet. The snapband receives a portion of the filter cartridge. A rigid non-metallic tubular mounting collar is integrally formed with filter media. The mounting collar includes a pair of longitudinally spaced continuous projections that extend radially outward. The mounting collar is adapted to be positioned within the snapband and engage surfaces of the snapband to effect sealing engagement of the snapband against surfaces of the opening in the tubesheet.

Yet another known attempt at a baghouse support and seal structure involves the use of a rubber grommet having a substantially C-shaped cross-section. The grommet is installed in a tubesheet opening and receives a metal ferrule. During insertion of the ferrule into the grommet, friction from relative movement therebetween tends to pull or roll the grommet out of position. The out-of-position grommet may not provide an effective seal with the tubesheet and ferrule.

Prior art filter mounting systems that incorporate metal mounting collars can be expensive to manufacture and take a relatively long time to fabricate. Snapbands are relatively expensive to manufacture, have relatively small tolerance of opening that they can properly fit and variations in cover fabric thickness makes it difficult to produce consistent finished sizes. Accordingly, the need exists for a filter and mounting systems that are inexpensive, can be quickly manufactured, easy to install and replace in a baghouse and that maintain a good seal. The present invention fills these needs and overcomes the disadvantages of the prior art filter mounting systems.

SUMMARY OF THE INVENTION

The present invention is directed to a filter mounting system for use in a baghouse having a tubesheet with a plurality of openings. The filter mounting system according to one embodiment of the present invention comprises a filter assembly including filter media and a tubular mounting collar to mount the filter media relative to the tubesheet. The filter mounting system also comprises a gasket made of a flexible material. The gasket has a tubesheet receiving portion and a filter receiving portion extending from the tubesheet receiving portion. The mounting collar of the filter assembly is adapted to be positioned within the filter receiving portion of the gasket and engage the filter receiving portion to effect sealing engagement of the tubesheet receiving portion of the gasket against a portion of the tubesheet adjacent the opening. The filter receiving portion extends from the tubesheet receiving portion to force one portion of the gasket into sealing engagement with a surface of the tubesheet upon engagement with the mounting collar.

The filter receiving portion of the gasket has a tapered surface that functions as a lever to pivot the tubesheet receiving portion into engagement with the portion of the tubesheet. The filter assembly is a filter cartridge and the filter media is a pleated filter element. An annular surface extends from the mounting collar for establishing the position of the filter cartridge relative to the tubesheet and for sealing engagement of another portion of the gasket with another surface of the tubesheet.

A projection extends from one of the mounting collar and the gasket. A groove is formed in the other of the gasket and the mounting collar. The projection is receivable within the groove to locate and secure the mounting collar relative to the gasket and further form a seal therebetween.

The hardness of the gasket is less than the hardness of the mounting collar. The filter receiving portion of the gasket is made from a conformable material having a hardness in the range of about 30 to 65 Shore A. The mounting collar is made from a rigid non-metallic material having a hardness in the range of about 50 Shore A to 85 Shore D.

In another embodiment of the invention, the filter mounting system comprises a filter and a gasket. The filter includes filter media and a tubular mounting collar to mount the filter media relative to the tubesheet. The gasket is made of a flexible material. The gasket has a tubesheet receiving portion and a filter receiving portion axially spaced from the tubesheet receiving portion. The tubesheet receiving portion has a pair of axially spaced tubular surfaces. The mounting collar includes a pair of axially spaced continuous circumferential projections extending from the collar. The mounting collar is adapted to be positioned within said tubesheet receiving portion of the gasket. Each projection of the mounting collar engages a respective one of the tubular surfaces of the tubesheet receiving portion to force portions of the gasket against surfaces of the tubesheet adjacent the opening to effect sealing engagement therebetween.

The mounting collar is also adapted to be positioned within the filter receiving portion of the gasket and engage the filter receiving portion to effect sealing engagement of the tubesheet receiving portion of the gasket against another portion of the tubesheet adjacent the opening. The filter receiving portion extends from the tubesheet receiving portion to force one portion of the gasket into sealing engagement with a surface of the tubesheet upon engagement with the mounting collar. The mounting collar further includes an annular surface extending from the mounting collar for establishing the position of the filter relative to the tubesheet.

BRIEF DESCRIPTION OF THE DRAWINGS

Further features of the present invention will become apparent to those skilled in the art to which the present invention relates from reading the following description with reference to the accompanying drawings, in which.

DESCRIPTION OF PREFERRED EMBODIMENTS

Figure 1:
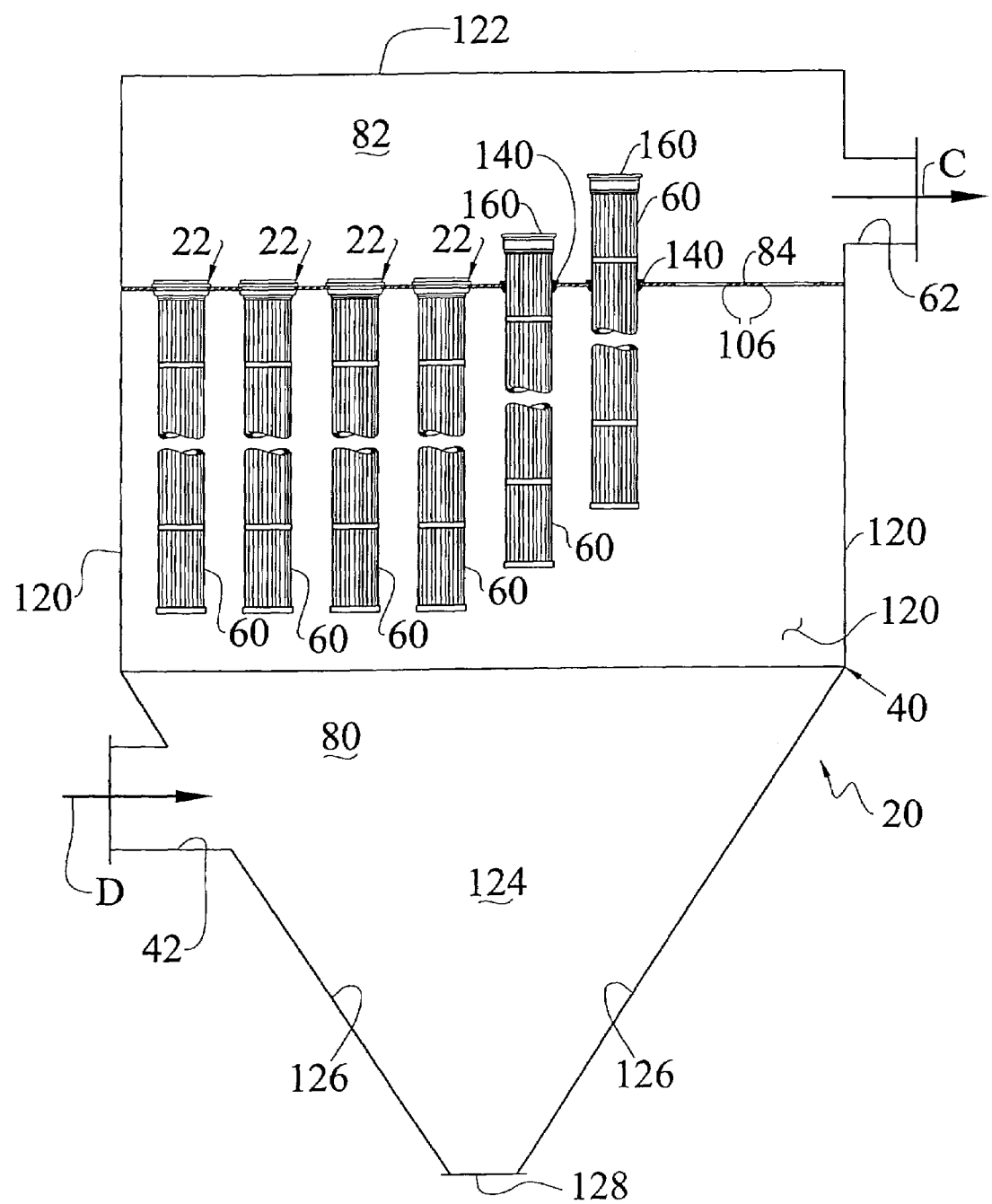
FIG. 1 is a schematic view, partly in section, of a baghouse with a filter mounting system constructed according to the present invention.

A baghouse 20 incorporating a filter mounting system 22 constructed according to one embodiment of the present invention is illustrated in FIG. 1. The baghouse 20 is defined by an enclosed housing 40. The housing 40 is made from a suitable material, such as sheet metal. Dirty or particulate-laden gas D enters the baghouse 20 through an inlet 42. The particulate-laden gas D is filtered by a plurality of filters 60 (FIG. 2) of the filter mounting system 22 installed in the baghouse 20. Particulates are removed from the gas flow by the filters 60. Cleaned gas C then flows from the interior of the filters 60 and exits the baghouse 20 through an outlet 62.

The baghouse 20 is divided into a "dirty air" plenum 80 and a "clean air" plenum 82 by a tubesheet 84 made from a suitable material, such as a metal plate or sheet. The inlet 42 is in fluid communication with the dirty air plenum 80. The outlet 62 is in fluid communication with the clean air plenum 82. The tubesheet 84 has at least a portion that is substantially planar for mounting and supporting the filters 60.

Figure 3:
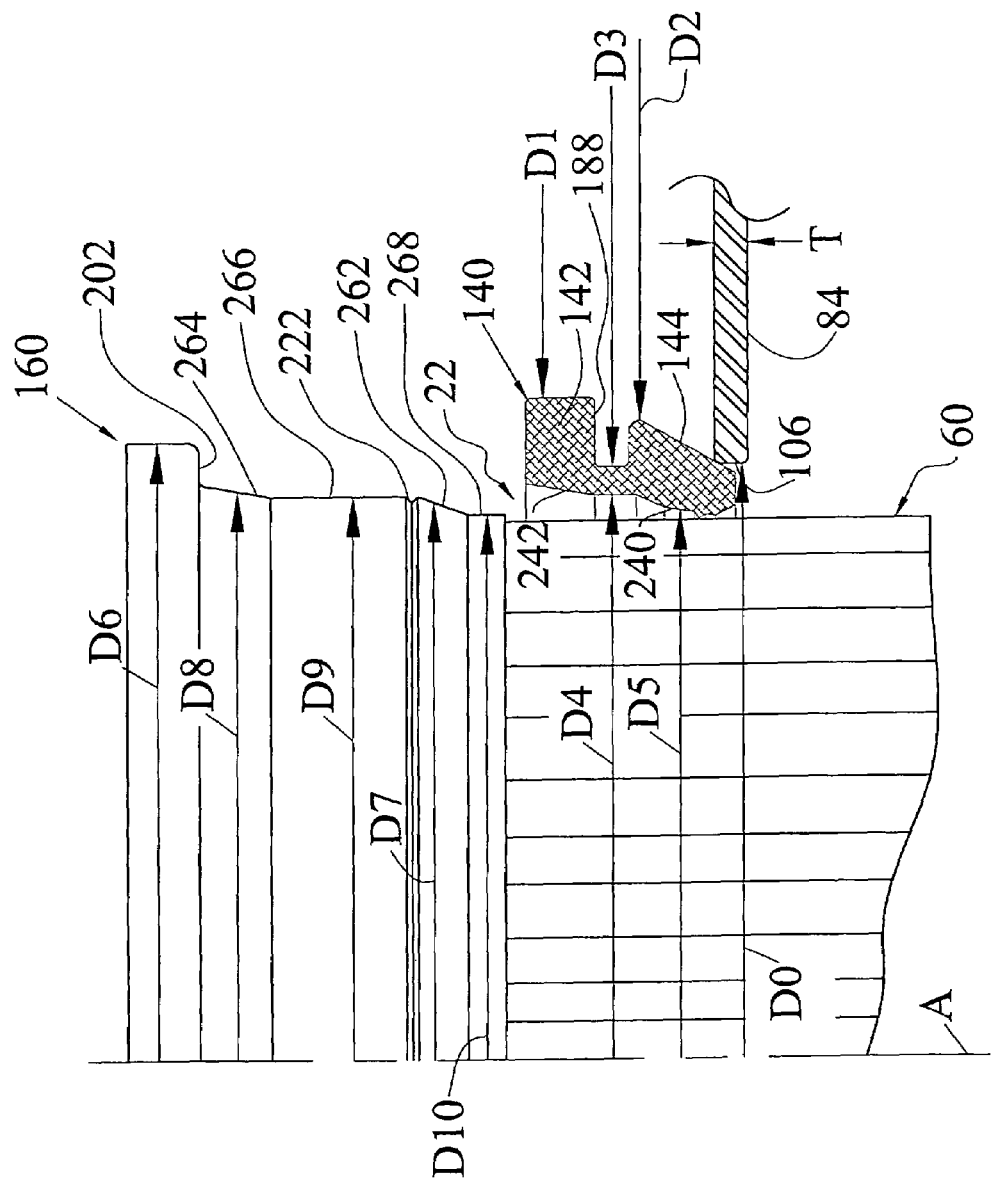
FIG. 3 is an enlarged exploded view, partly in section, of a portion of the filter mounting system according to one embodiment of the present invention, taken approximately along line 3—3 in FIG. 2.
Figure 4:
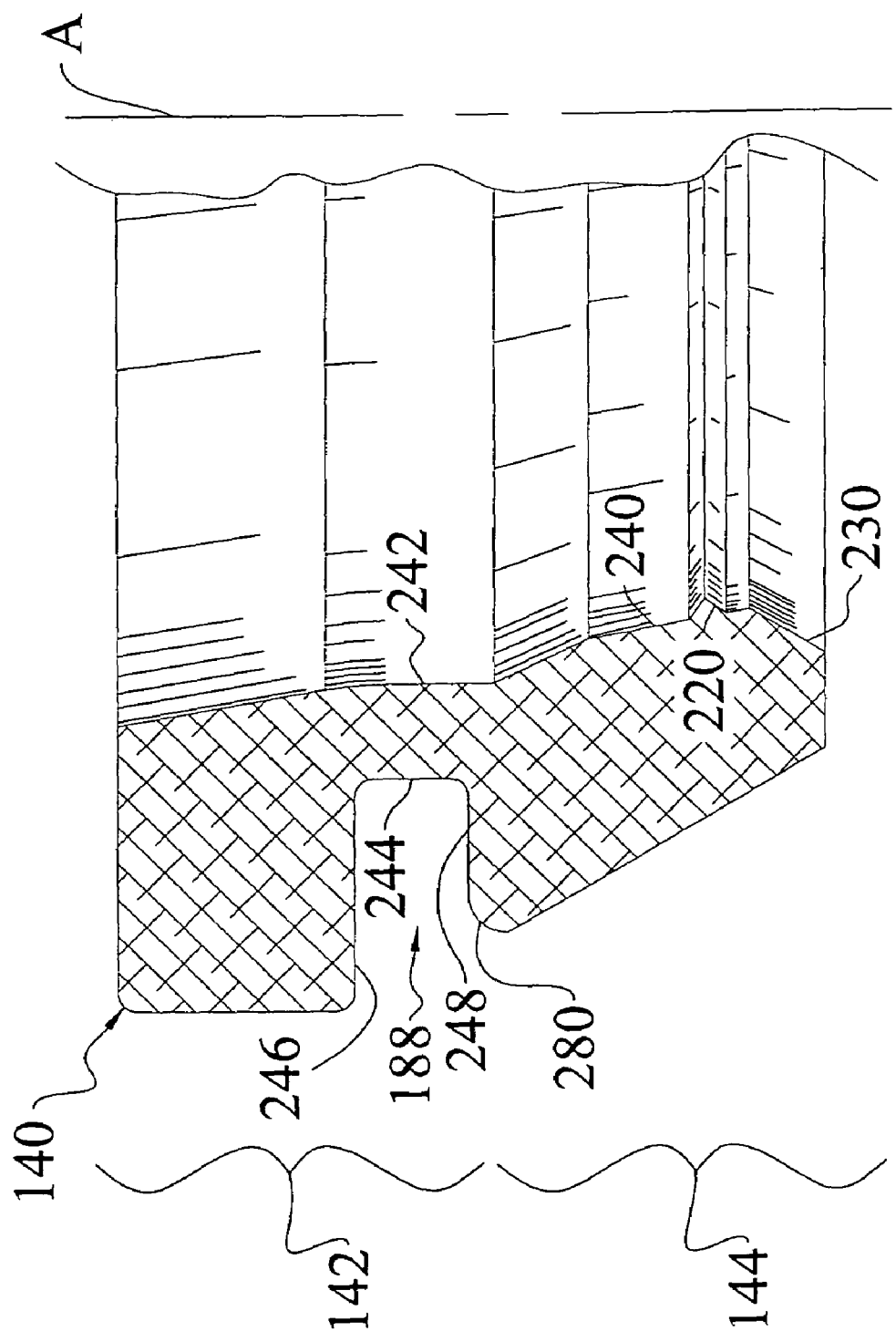
FIG. 4 is an enlarged sectional view of a portion of a gasket of the filter mounting system of the present invention.
Figure 5:
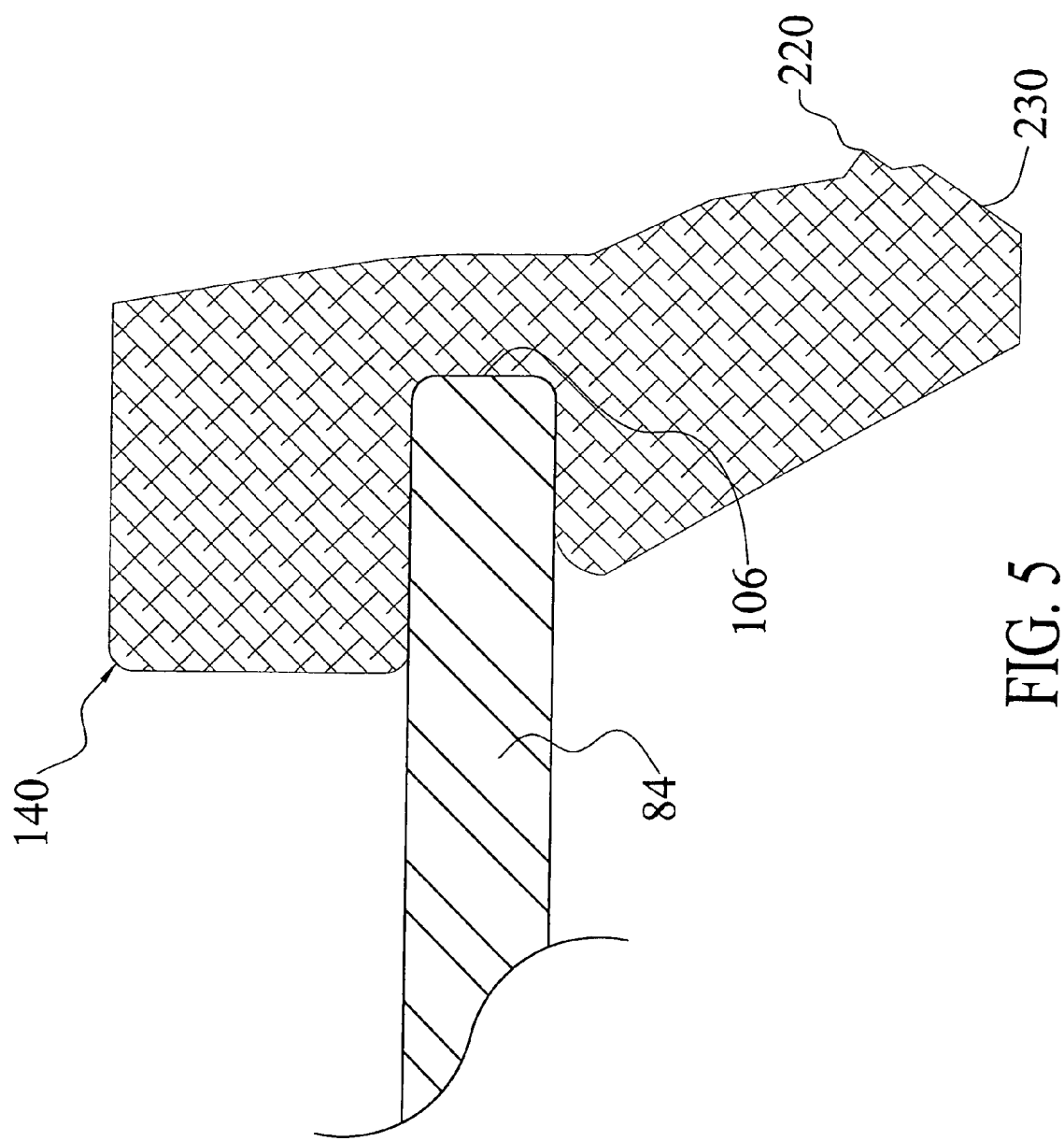
FIG. 5 is an enlarged sectional view of a portion of the gasket installed in an opening in the tubesheet of the baghouse.

A plurality of openings 106 extend through the planar portion of the tubesheet 84. Each opening 106 in the tubesheet 84 has an effective diameter D0 (best seen in FIG. 3), defined by the inner circumferential surface of the opening, through which components of the filter mounting system 22 can be installed or moved.

The housing 40 (FIG. 1) of the baghouse 20 includes sides 120 and a roof 122. The baghouse 20 also has an accumulation area 124 defined by sloped walls 126 located at a lower end of the dirty air plenum 80. Particles in the accumulation area 124 can be removed through the bottom region 128 of the baghouse 20. The filters 60 are illustrated as extending a distance that approaches the dirty air plenum 80. It will be apparent that the filters 60 may extend into the dirty air plenum 80.

Figure 2:
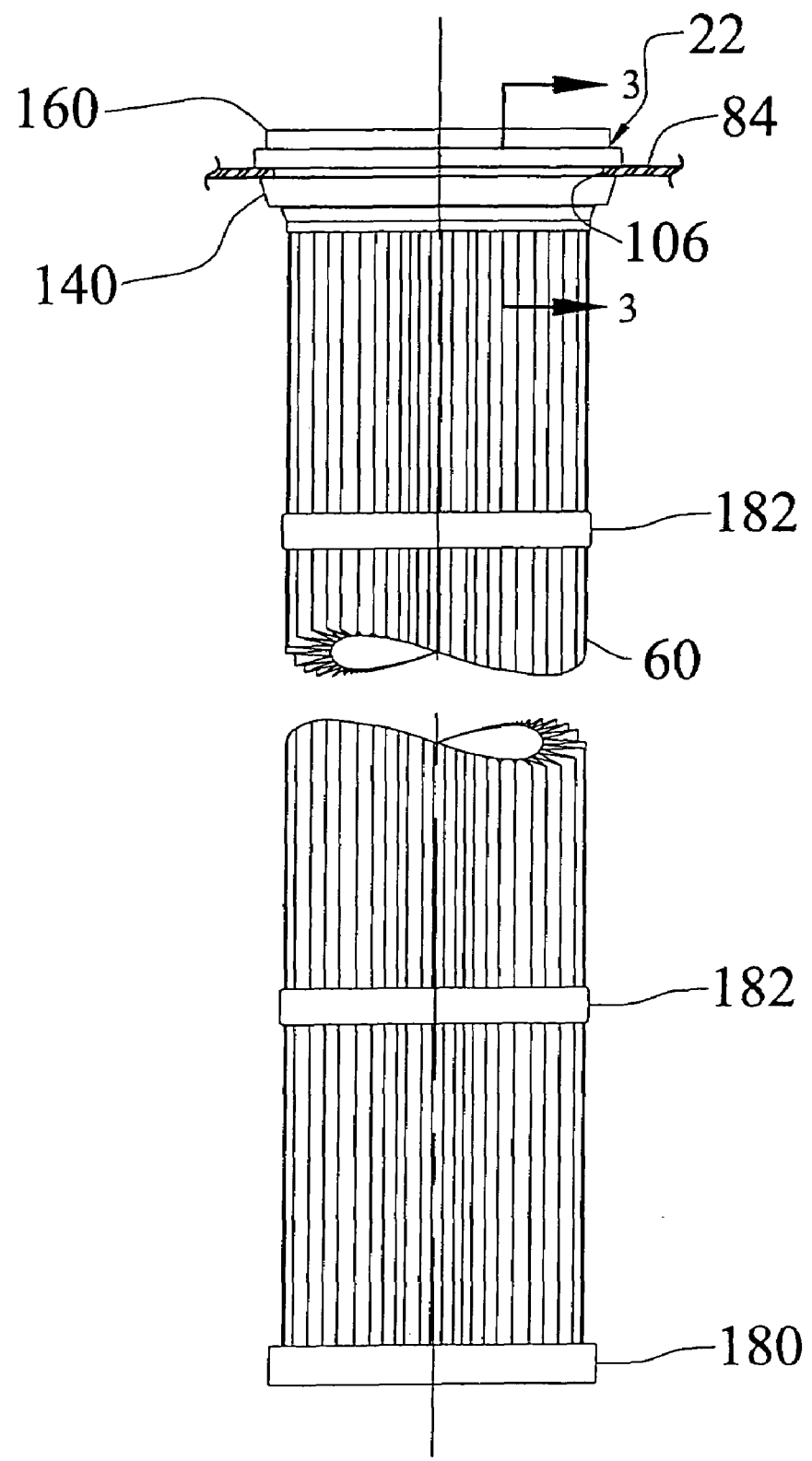
FIG. 2 is an elevational view of the filter mounting systems supporting a filter in an opening of a tubesheet of the baghouse.

The filter mounting system 22 includes a resilient mounting gasket 140 (FIGS. 1–7) that is located in the opening 106 in the tubesheet 84 (best seen in FIGS. 4–7). The filter mounting system 22 also includes filters 60 that separate particulates from the particulate-laden gas D as the gas passes radially inward through each filter. The illustrated filters 60 are in the form of a "cartridge" but could be in the form of a "bag" or other suitable configuration. Each filter 60 is supported at its upper end as viewed in FIGS. 1–7, by the tubesheet 84 and gasket 140, and extends downwardly in a substantially vertical direction. It will be apparent that the filters 60 could be oriented in any direction. As illustrated in FIG. 2, each filter 60 is positioned to extend downwardly through the gasket 140, and the opening 106 in tubesheet 84, until a portion of the filter rests against an upper end surface of the gasket.

The gasket 140 (FIG. 4) has a tubesheet receiving portion 142 and a filter receiving portion 144 extending axially from the tubesheet receiving portion. The tubesheet receiving portion 142 of the gasket 140 has a relatively constant maximum outer diameter D1 (FIG. 3) that is greater than the diameter D0 of the opening 106 in the tubesheet 84. The filter receiving portion 144 of the gasket 140 has a tapered outer surface with a largest outer diameter D2 that is greater than the diameter D0 of the opening 106. The diameter D2 of the filter receiving portion 144 is less than the diameter D1 of the tubesheet receiving portion 142.

A U-shaped groove 188 is formed in an outer region of the tubesheet receiving portion 142 of the gasket 140. The groove 188 has an inner diameter D3 that is substantially equal to the diameter D0 of the opening 106. The tubesheet receiving portion 142 has a tapered inner surface 242 with a minimum inner diameter D4 when the gasket 140 is in its "free" or uninstalled state. The filter receiving portion 144 has a tapered inner surface 240 with a minimum inner diameter D5 that is less than diameter D4.

A mounting collar 160 (FIGS. 2 and 3) of the filter 60 is adapted to be positioned within the filter receiving portion 144 of the gasket 140 and to engage the filter receiving portion and effect sealing engagement of the tubesheet receiving portion 142 of the gasket against a portion of the tubesheet 84 adjacent the opening 106. The filter receiving portion 144 extends axially from the tubesheet receiving portion 142 and forces one portion of the gasket 140 into sealing engagement with a surface of the tubesheet 84 upon engagement with the mounting collar 160. The gasket 140 (FIGS. 3 and 4) is preferably made from a resilient elastomeric material, such as a terpolymer of ethylene, propylene and a diene (EPDM) that can easily be molded. The gasket 140 may also be made from any similar suitable material such as natural rubber, synthetic rubber or silicone rubber. The gasket 140 has a hardness in the range of about 30 to 65 Shore A.

Figure 6:
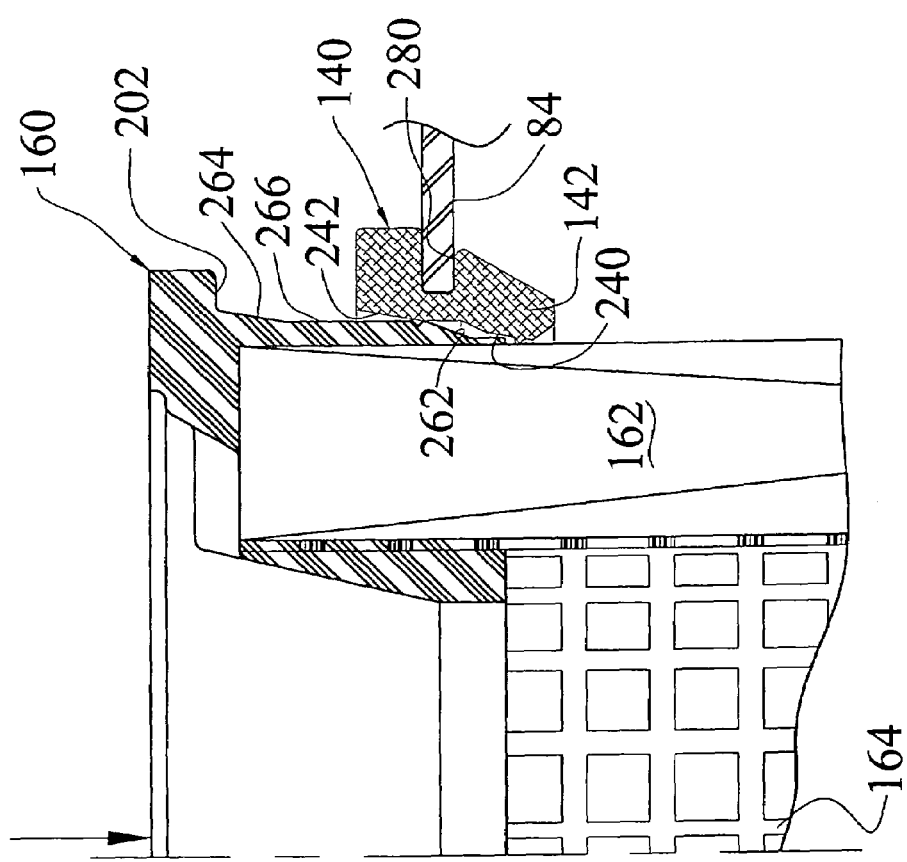
FIG. 6 is an enlarged sectional view of a filter being installed into the gasket mounted in the opening in the tubesheet.

The filter 60 includes filtration media in the form of a pleated filter element 162 (FIG. 6). The filter 60 includes a perforated support structure or tube 164. The support tube 164 is made of any suitable material such as plastic or metal. The pleated filter element 162 is located concentrically around the support tube 164. The support tube 164 prevents the pleated filter element 162 from moving in a radial inward direction during operation. It will be apparent that the pleated filter element 162 could alternatively be located radially inward of the tube 164. The pleated filter element 162 is formed in a substantially tubular shape about the outer perimeter of the tube 164 with accordion folds at its inner and outer peripheries, as is known. The pleated filter element 162 may be constructed of any suitable material for a desired filtering requirement. Each filter 60 has a longitudinal central axis A. It will be appreciated that support tube 164, shown as a perforated sleeve, may be substituted with a cage and the pleated filter element 162 may be substituted for a "bag".

The upper ends of the tube 164 and pleated filter element 162 are located in the mounting collar 160 during molding of the mounting collar to seal and retain the pleated filter element and the support tube. The mounting collar 160 is integrally formed with the pleated filter element 162 and support tube 164 during a molding operation to provide a "unitary" cartridge. The mounting collar 160 is made from a material that is preferably relatively rigid. Thus, the support tube 164 and pleated filter element 162 are structurally and sealingly secured to the mounting collar 160. The mounting collar 160 has a maximum outer diameter D6 (FIG. 3) that is greater than the largest inner diameter D4 of the gasket 140 and diameter D0 of the opening 106 in the tubesheet 84 so the filter 60 cannot move downwardly completely through the gasket and opening.

The mounting collar 160 is preferably molded from a plastic material. It will be apparent that any suitable rigid material can be used, such as a plastic, epoxy, ceramic, metal, silicone, or urethane composition. The molded mounting collar 160 has a hardness in the range of 50 Shore A to 85 Shore D, preferably at least 70 Shore D. In any case, the mounting collar 160 has a hardness greater than the hardness of the gasket 140. This preferred hardness assures that the mounting collar 160 is sufficiently rigid and not prone to significant deformation under typical installation and operational forces. The preferred hardness differential also assures that the gasket 140 deforms rather than the mounting collar 160 during installations and operation. Since the mounting collar 160 is preferably molded it is generally cheaper, easier and faster to fabricate than some previous known filter mounting structure with metal components.

The filter 60 has a molded lower end cap 180 (FIG. 2). The pleated filter element 162 and support tube 164 are molded into the end cap 180 preferably by the same rigid material as the mounting collar 160, such as plastic, epoxy, ceramic, silicone, or urethane composition. A pair of retention devices 182 retain the pleated filter element 162 from excessive radial outward movement during a cleaning cycle of back-flushing gas. A pair of retention devices 182 are illustrated on the filter 60 for example purposes only. The exact number of retention devices 182 used depends on the length of the pleated filer media element 162.

An annular ridge or surface 202 extends radially outward from the mounting collar 160. The annular surface 202 establishes the position of the filter 60 against an upper surface of the gasket 140 and, thus, relative to the tubesheet 84 when the components are properly installed. The annular surface 202 also forms part of a seal with the gasket 140. Thus, a relatively strong connection and structure with a good seal exists that is capable of supporting the weight of the filter 60 as it hangs from the tubesheet 84 even when the filter mounting system is laden with a relatively heavy accumulation of particles.

The mounting collar 160 has a first or lower tapered outer surface 262 with a diameter D7 and a second or upper tapered outer surface 264 with a diameter D8 greater than the diameter D7. A generally cylindrical outer surface 266 with an outer diameter D9 is located axially between the first tapered surface 262 and second tapered surface 264. A generally cylindrical end surface 268 with a diameter D10 extends from the lower tapered surface 262.

It will be apparent that the gasket 140 must be installed in the opening 106 of the tubesheet before the filter 60 is moved into the gasket. During downward movement of the filter 60 relative to the gasket 140 installed in the opening 106 of the tubesheet 84, the filter receiving portion 144 functions as a lever to pivot the tubesheet receiving portion 142 into engagement with the portion of the tubesheet 84. A projection 220 extends radially inward from the lowered tapered surface 240 of the gasket 140. A receiving area in the form of a groove 222 is formed in the mounting collar 160. The projection 220 is receivable within the groove 222 and engagable with a surface defining the groove to locate and secure the mounting collar 160 relative to the gasket 140 and form a seal therebetween and to provide increased resistance to upward movement of the filter 60.

The gasket 140 may be easily deformed and manually inserted into the opening 106 in the tubesheet 84 prior to receiving the filter 60. During installation, a bottom surface 244 (FIG. 4) of the groove 188 in the gasket 140 snugly engages the circumferential inner surface defining the opening 106 in the tubesheet 84. Side surfaces 246, 248 of the groove 188 may or may not engage surfaces of the tubesheet 84 adjacent the opening 106. The groove 188 can be slightly wider than thickness T of the tubesheet 84 adjacent the opening 106.

To install the filter 60, the end cap 180 and the majority pleated filter element 162 are moved axially downward through the gasket 140 properly seated in the opening 106. The end 268 of the mounting collar 160 is moved axially downward relative to the gasket 140 to concentrically align the filter 60. The lower tapered surface 262 of the mounting collar 160 passes through the upper tapered surface 242 of the gasket 140. The lower tapered surface 262 of the mounting collar 160 then engages the lower tapered surface 240 of the gasket 140. The lowermost part of the filter receiving portion 144 of the gasket moves in a radial outward direction and forces or pivots, the outermost radial portion 280 of the lower surface 248 of groove 188 to engage and seal the gasket 140 against a portion of the lower surface of the tubesheet 84 adjacent opening 106. This occurs around the entire circumference of the opening 106 as the filter 60 moves further axially downward relative to the gasket 140 and tubesheet 84.

Figure 7:
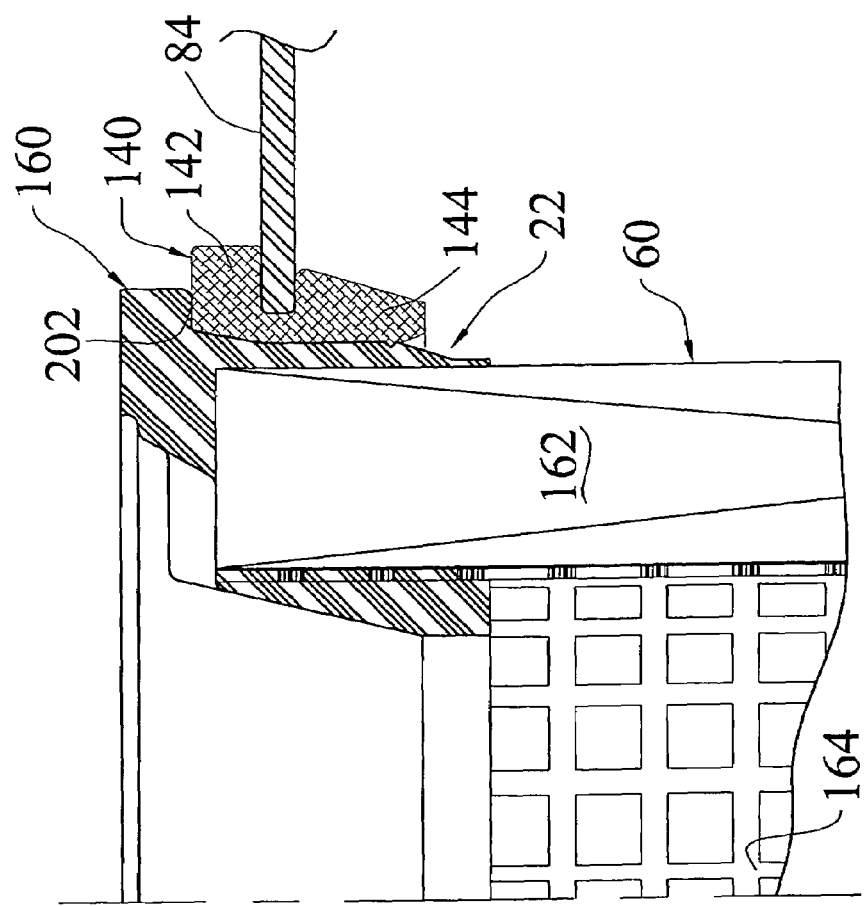
FIG. 7 is a view of the filter mounting system similar to FIG. 6 with the filter installed in the gasket and tubesheet.

Further downward movement of the filter 60 relative to the gasket 140 and tubesheet 84 from the position illustrated in FIG. 6 to the position illustrated in FIG. 7 results in increased sealing force. The filter receiving portion 144 is forced to expand further radially outward a uniform amount about its circumference. This action further forces the lower surface 280 of the groove 188 of the gasket 140 against the lower surface of the tubesheet 84 adjacent the opening 106. Concurrently, the tubular surface 266 of the mounting collar 160 engages the inside tapered surface 240 of the gasket 140 at a location radially inward of the groove 188. This further forces the bottom surface 244 of the groove 188 in the gasket 140 against the inner circumferential surface of the opening 106.

Concurrently, the upper tapered surface 264 of the mounting collar 160 engages the upper tapered surface 242 of the gasket 140. This action forces the upper surface 246 of the groove 188 in the tubesheet receiving portion 142 of the gasket 140 to pivot downwardly against upper surface of the tubesheet 84 adjacent the opening 106. Annular surface 202 engages the uppermost surface of the gasket 140 and further forces the upper surface 246 of the groove in the tubesheet receiving portion 142 against the tubesheet 84 to form a quality seal. Thus, any potential leakage path between the tubesheet 84 and gasket 140 as well as between the gasket and mounting collar of the filter 60 is blocked by the filter mounting system of the present invention.

Friction between the gasket 140 and mounting collar 160 of the filter 60 provides a significant force to retain the filter in a fixed position relative to the gasket as well as the gasket against the tubesheet 84. However, additional structure is provided to assure that the filter 60 does not unintentionally move axially upward relative to the gasket 140 and tubesheet 84 and thereby adversely affect the sealing of the filter mounting system 22 of the present invention. Such structure is in the form of the projection 220 on the gasket 140 being received in the circumferential groove 222 in the mounting collar 160 upon the filter 60 being moved a sufficient downward amount relative to the gasket so the projection can snap radially outwardly a relatively small amount into the groove. This interaction creates more resistance to upward movement of the filter 60 relative to the gasket 140 and tubesheet 84.

The gasket 140 also includes an inner beveled edge 230 at the lower end of the filter receiving portion 144. The beveled edge 230 is a region that does not engage the mounting collar 160. Thus, the lower area of the gasket 140 does not catch the mounting collar 160 upon removal by upward movement of the filter 60 from within the gasket. This minimizes the possibility of the gasket 140 "rolling up" and interfering with removal of the filter 60.

The filter mounting system 22 of the present invention is highly useful for providing an effective dust-tight seal between a filter 60 and baghouse tubesheet 84. The present invention is also easy to manufacture, install, and replace, and may be subjected to loads which will not cause the seal to be broken. The present invention also accommodates a greater variation in the diameter of the opening 106 in the tubesheet 84 that the filter mounting system 22 may be installed in.

Figure 8:
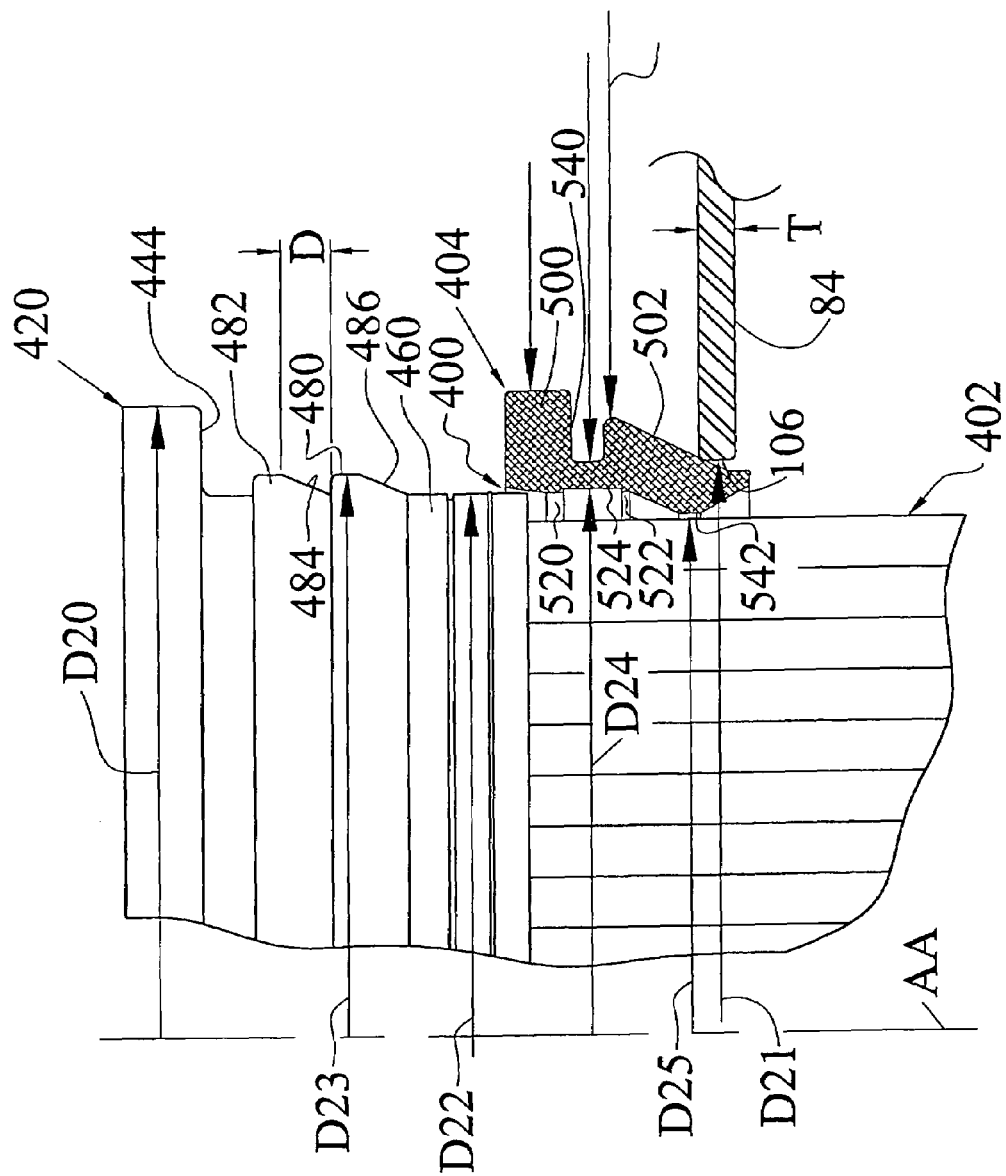
FIG. 8 is an enlarged exploded view, partly in section and similar to FIG. 3, of a portion of the filter mounting system according to another embodiment of the present invention.

An alternate embodiment of the present invention includes a filter mounting system 400 (FIG. 8) with a filter 402 and gasket 404. The filter 402 can be of any suitable structure, such as the illustrated "cartridge" structure. The filter 402 includes a mounting collar 420. The mounting collar 420 is preferably molded from a plastic material. It will be apparent that any suitable rigid material can be used, such as a plastic, epoxy, ceramic, silicone, or urethane composition. The molded mounting collar 420 has a hardness in the range of Shore D 30 to Shore D 85 and preferably at least Shore D 70. This relative hardness assures that the mounting collar 420 is substantially rigid and not prone to significant deformation under typical installation and operational forces. Since the mounting collar 420 is molded it is generally cheaper, easier and faster to fabricate than some previous known filter mounting structure components.

Figure 10:
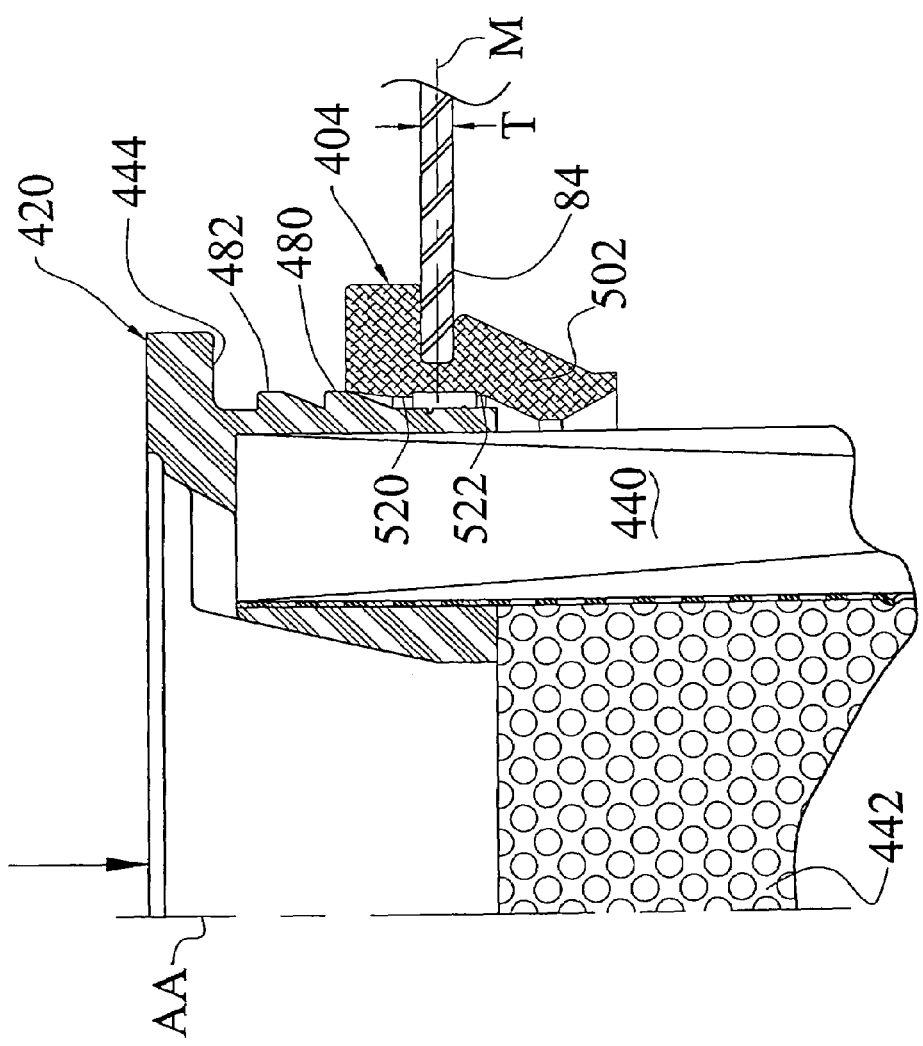
FIG. 10 is an enlarged sectional view of a filter being installed into the gasket mounted in the opening in the tubesheet.

The filter media 402 includes filter media in the form of a pleated filter element 440 (FIG. 10). The filter 402 also includes a perforated support structure or tube 442. The support tube 442 is made of any suitable material such as plastic or metal. The pleated filter element 440 is located concentrically around the support tube 442. The support tube 442 prevents the pleated filter element 440 from moving in a radial inward direction during operation. It will be apparent that the pleated filter element 440 could alternatively be located radially inward of the tube 442. The pleated filter element 440 is formed in a substantially tubular shape about the outer perimeter of the tube 442 with accordion folds at its inner and outer peripheries. The pleated filter element 440 may be constructed of any suitable material for a desired filtering requirement. Each filter 402 has a longitudinal central axis AA.

The mounting collar 420 is integrally formed with the pleated filter element 440 and tube 442 during a molding operation to provide a "unitary" cartridge. Thus, the tube 442 and pleated filter element 440 are structurally and sealingly secured to the mounting collar 420. The mounting collar 420 has an upper portion with a lower annular surface 444 (FIG. 8) with outer diameter D20 that is greater than the inner diameter D21 of the opening 106 in the tubesheet 84.

The annular surface 444 extends from the mounting collar 420. The annular surface 444 establishes the position of the filter 402 against an upper surface of the gasket 404 and, thus, relative to the tubesheet 84. The annular surface 444 also forms part of a seal with the gasket 404. Thus, a relatively strong connection and structure with a good seal exists that is capable of supporting the weight of the filter a 402 as it hangs from the tubesheet 84 even when the filter assembly has a relatively heavy accumulation of particles. As shown in FIG. 10, cylindrical filter 402 is positioned downwardly through gasket 404, and the opening 106 in tubesheet 84, until the annular surface 444 of the mounting collar 420 rests against an upper surface of the gasket as described in detail below.

The mounting collar 420 includes a lower tubular portion 460 (FIG. 8) with an outer diameter D22. The mounting collar 420 has a pair of continuous projections 480, 482 with outer diameters D23 extending radially outward from the tubular portion 460. Each of the projections 480, 482 extends continuously about the circumference of the mounting collar 420. The projections 480, 482 are longitudinally spaced apart along the axis AA, a distance D that is substantially equal to or slightly greater than the thickness T of the tubesheet 84. Each of the projections 480, 482 has an outer diameter D23 which is slightly larger than an inner diameter D24 of the gasket 404. Each projection 480, 482 has a frustoconical leading edge surface 484, 486, respectively, to facilitate installation and concentric seating of the mounting collar 420 within the gasket 404.

Figure 9:
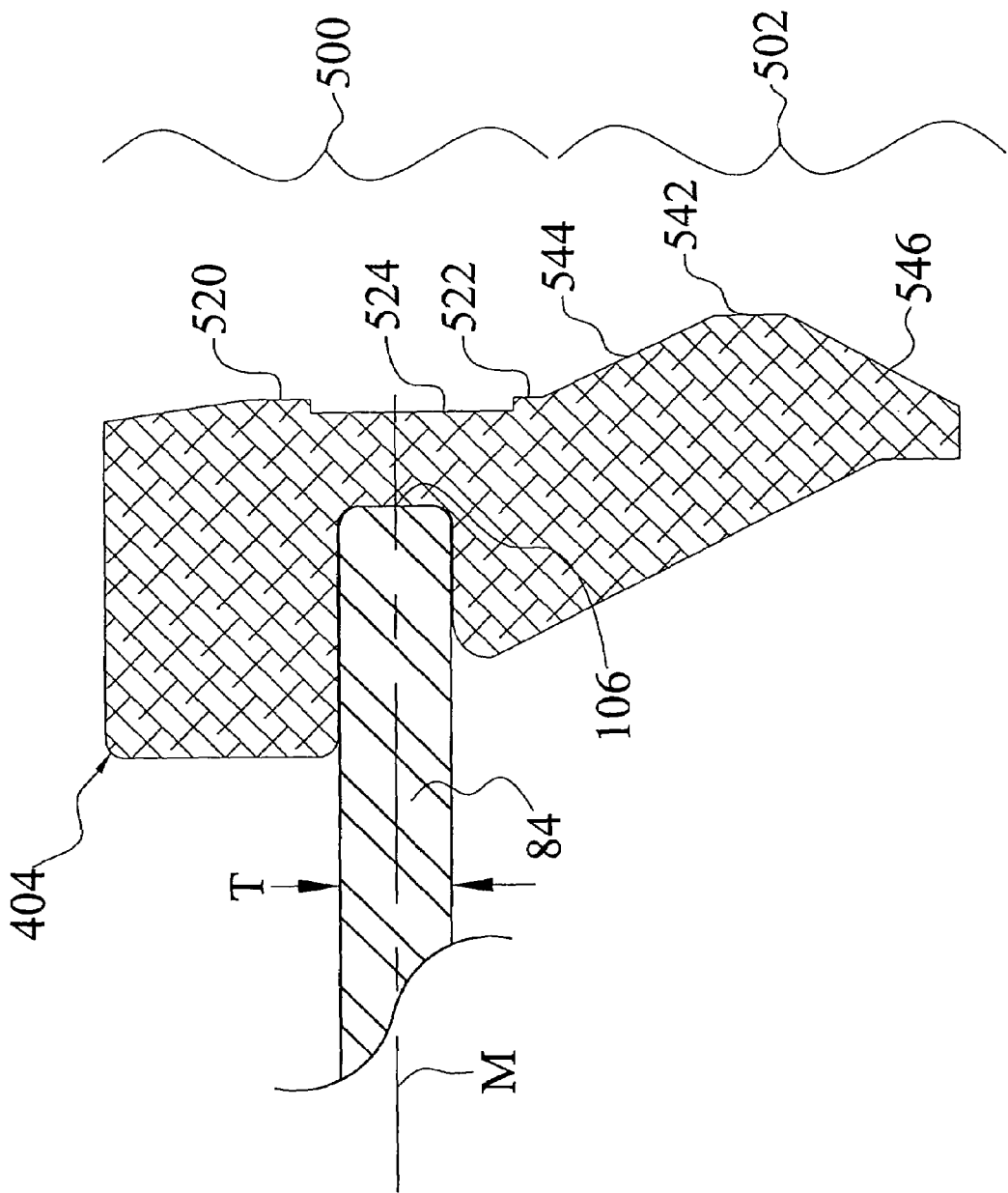
FIG. 9 is an enlarged sectional view of a portion of the gasket, illustrated in FIG. 8, installed in an opening in the tubesheet of the baghouse.

The gasket 404 (FIG. 9) has a tubesheet receiving portion 500 and a filter receiving portion 502 extending from the tubesheet receiving portion. The mounting collar 420 of the filter 402 is adapted to be positioned within the filter receiving portion 502 of the gasket 404 to engage the filter receiving portion and effect sealing engagement of the tubesheet receiving portion 500 of the gasket against a portion of the tubesheet 84 adjacent the opening 106. The filter receiving portion 502 extends axially from the tubesheet receiving portion 500 to force one portion of the gasket 404 into sealing engagement with a surface of the tubesheet 84 upon engagement with the mounting collar 420. The gasket 404 has a pair of axially spaced protrusions 520, 522 in the tubesheet receiving portion 500. The protrusions 520, 522 are spared apart by a depression 524 that has an axial length greater than the thickness T of the tubesheet 84.

The gasket 404 (FIGS. 3 and 4) is preferably made from a resilient elastomeric material, such as a terpolymer of ethylene, propylene and a diene (EPDM) that can easily be molded. The gasket 404 may also be made from any similar suitable material such as natural rubber, synthetic rubber or silicone rubber. Preferably the gasket 404 has a hardness in the range of about 30 to 65 Shore A.

Figure 11:
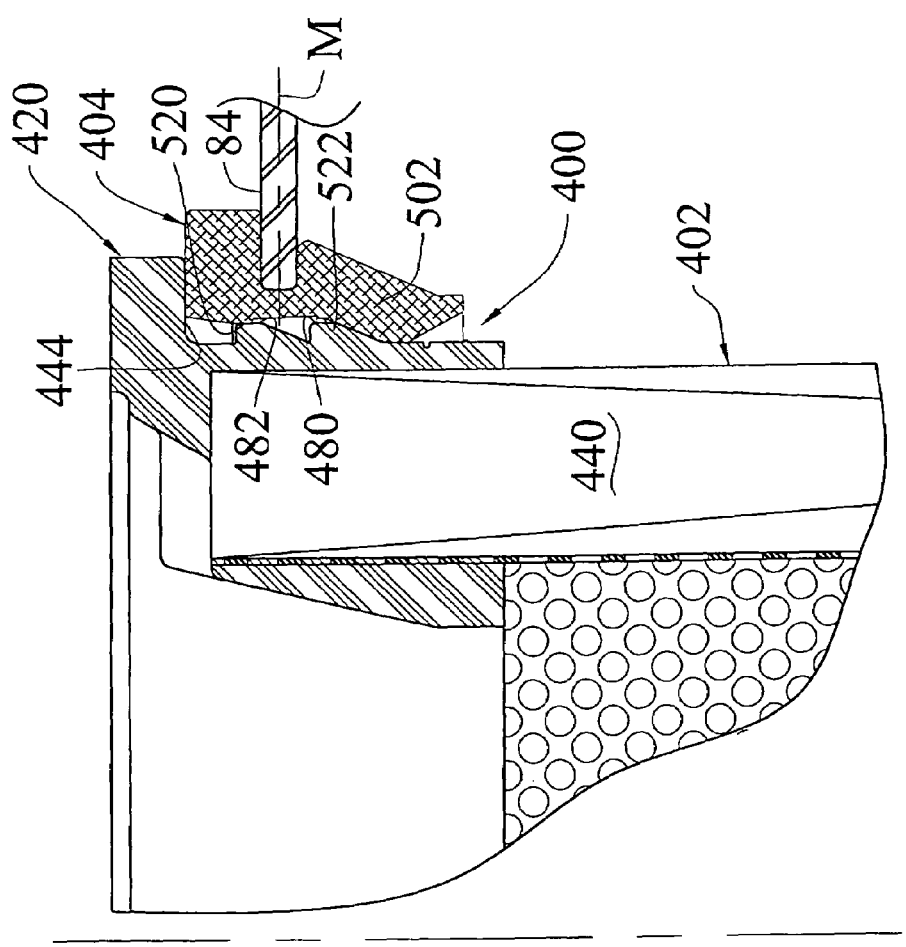
FIG. 11 is a view similar to FIG. 10 with the filter installed in the gasket and tubesheet.

The mounting collar 420 is positioned within the gasket 404 to engage the inner surface of the gasket and effect sealing engagement of the gasket against a portion of the opening 106 in the tubesheet 84. The upper projection 482 extends radially from the mounting collar 420 to force the upper protrusion 520 (FIG. 10) of the gasket 404 to sealingly engage the gasket 404 against a surface of the tubesheet 84 adjacent an upper portion of the opening 106, as illustrated in FIG. 11. The lower projection 480 forces the lower protrusion 522 of the gasket 404 into sealing engagement with another surface of the tubesheet 84 adjacent a lower portion of the opening 106.

The upper projection 482 of the mounting collar 420 is adapted to be located above the midpoint M of the thickness T of the tubesheet 84 to further force the upper protrusion 520 of the gasket 404 cause sealing engagement with the tubesheet 106. The lower projection 480 of the mounting collar is adapted to be located below the midpoint M of the thickness T of the tubesheet 84 to further force the lower protrusion 522 of the gasket 404 cause sealing engagement with the tubesheet 84. The protrusions 520, 522 are separated by the depression 524 that minimizes friction between the gasket 404 and mounting collar 420 that could cause the gasket to roll up and move from within the opening 106 in the tubesheet 84 during installation of the filter 60.

The gasket 404 also has a generally U-shaped groove 540 (FIG. 8) found in its outer surface. The gasket 404 also has a lower projecting portion 542 (FIG. 9) with an inner diameter D25 located between two tapered surfaces 544, 546 of the filter receiving portion 502.

During an installation procedure, the flexible gasket 404 is positioned into the opening 106 in the tubesheet 84 by inwardly flexing and deforming the gasket to collapse it. The gasket 404 is positioned within the opening so the groove 540 captures a portion of the tubesheet 84. The deforming force is then released to allow the gasket 404 to resiliently engage the inner periphery of the opening 106. The filter 402 is inserted into the opening 106 so the pleated filter element 440 extends through the gasket 404. The mounting collar 420 is then pressed downwardly into the gasket 404 until a lower lead edge 486 of the projection 480 engages the tapered surface 544 of the gasket 404, as illustrated in FIG. 10. The filter 402 is forced further into the gasket 404.

The leading surface 486 of the lower projection 480 of the mounting collar 420 engages the tapered surface 544 of the filter receiving portion 502 of the gasket during downward movement of the filter 60 relative to the tubesheet 84. The filter receiving portion 502 pivots so at least a portion of the lower surface of the groove 540 engages the lower surface of the tubesheet 84 adjacent the opening 106. This provides a quality seal between the filter 60 and tubesheet 84. The outwardly extending projections 480, 482 of mounting collar 420 are in the position shown in FIG. 11. Preferably, the lower projection 480 engages with the protrusion 522 of gasket 404 at a location that is substantially at, or slightly lower than, the midpoint M of the thickness T of the tubesheet 84. The uppermost projection 482 engages the protrusion 520 of the gasket 404 at a location above the midpoint M of the thickness T of the tubesheet 84. The projections 480, 482 force the respective protrusions 520, 522 into further continuous sealing engagement with two different surfaces of the tubesheet 84 adjacent the opening 106. The tubular portion 460 of the mounting collar 420 engages and seats against the projecting portion 542 to form a seal.

As shown in FIG. 11, the dimensions of mounting collar 420 and gasket 404 are such that, when mounting collar is properly positioned within the gasket, the annular surface 444 of the mounting collar rests on the upper surface of the gasket. This is highly desirable because loads applied to the mounting collar 420 of the filter assembly 28, such as when workers are walking thereon, are transmitted downwardly to the gasket 404 and tubesheet 84 and do not adversely effect the seal established by the gasket.

The lower tapered surface or beveled edge 546 at the lower end of the filter receiving portion 502 of the gasket 404 does not engage the mounting collar 420. Thus, the lower area of the gasket 404 does not catch the mounting collar 420 upon removal by upward movement of the filter 60 from within the gasket. This minimizes the possibility of the gasket 404 "rolling up" and interfering with removal of the filter 60.

The present invention is highly useful for providing an effective dust-tight seal between a filter 402 and tubesheet 84. The present invention is also easy to manufacture, install, and replace, and may be subjected to loads which will not cause the seal to be broken. The filter 402 of the present invention may be walked on after it is installed in a baghouse 20 and not lose its seal. This is attributable to the new rigid non-metallic mounting collar 420 that will not deform during such loads and retains its shape against the gasket 404 that it was installed with.

From the above description of at least one preferred embodiment of the invention, those skilled in the art will perceive improvements, changes and modifications. Such improvements, changes and modifications within the skill of the art are intended to be covered by the appended claims.

Having described at least one preferred embodiment of the invention, what is claimed is:

1. A filter mounting system for use in a baghouse having a tubesheet with a plurality of openings, said filter mounting system comprising;

a filter assembly including:
  filter media; and
    a rigid non-metallic tubular mounting collar attached to said filter media to mount said filter media relative to the tubesheet, said mounting collar having a tapered surface portion extending from a tubular portion;
  a gasket made of a flexible elastometic material, said gasket having a tubesheet receiving portion and a filter receiving portion extending from said tubesheet receiving portion, said filter receiving portion having a tapered surface portion that forces a first portion of said tubesheet receiving portion of said gasket into engagement with a first portion of the tubesheet upon engagement with said tapered surface portion of said mounting collar during installation of said filter assembly in said gasket;
  said tubular portion of said mounting collar of said filter assembly adapted to be positioned within said filter receiving portion of said gasket and engaging said filter receiving portion to effect sealing engagement of a second portion of said tubesheet receiving portion of said gasket against a second portion of the tubesheet.

2. The filter mounting system of claim 1 wherein said tubesheet receiving portion includes a pair of axially spaced tubular surfaces and said mounting collar includes a pair of axially spaced continuous circumferential projections, said mounting collar adapted to be positioned within said tubesheet receiving portion of said gasket and said projections engaging a respective one of said tubular surfaces to force portions of said gasket against two surfaces of the tubesheet adjacent the opening to effect sealing engagement therebetween.

3. The filter mounting system of claim 1 further including an annular surface extending from said mounting collar for establishing the position of said filter cartridge relative to the tubesheet and sealing engagement of another portion of said gasket with another surface of the tubesheet.

4. The filter mounting system of claim 1 further including an annular ridge extending from said mounting collar for establishing sealing engagement with said filter receiving portion of said gasket.

5. The filter mounting system of claim 1 wherein said filter receiving portion of said gasket is made from a conformable material having a hardness in the range of about 30 to 65 Shore A.

6. The filter mounting system of claim 1 wherein said filter receiving portion has a second tapered surface that forces a third portion of said tubesheet receiving portion into engagement with a third portion of the tubesheet upon engagement with a second tapered surface of said mounting collar.

7. The filter mounting system of claim 1 wherein said filter media is a pleated filter element.

8. The filter mounting system of claim 1 wherein said mounting collar is made from a material having a hardness in the range of about 50 Shore A to 85 Shore D.

9. The filter mounting system of claim 1 further including a projection extending from one of said mounting collar and said gasket and a receiving area formed in the other of said gasket and said mounting collar, said projection receivable within the receiving area and engagable with a surface defining the receiving area to locate and secure said mounting collar relative to said gasket and form a seal therebetween.

10. The filter mounting system of claim 1 further including a first filter receiving portion having a first inner dimension and a second filter receiving portion having a second inner dimension, the first inner dimension being less than the second inner dimension.

11. The filter mounting system of claim 1 wherein the hardness of said gasket is less than the hardness of said mounting collar.

12. A gasket for mounting a filter assembly in a baghouse that has a tubesheet with a plurality of openings, said gasket made of a flexible elastomeric material and having a tubesheet receiving portion and a filter assembly receiving portion extending from said tubesheet receiving portion, said receiving portion having a tapered surface for engaging a portion of the filter assembly to effect a seal with the filter assembly and the tubesheet.

13. The gasket of claim 12 wherein said tubesheet receiving portion is concurrently engagable with two or more surfaces of the tubesheet to effect a seal adjacent the opening.

14. The gasket of claim 12 wherein said tubesheet receiving portion includes a pair of axially spaced tubular surfaces.

15. The gasket of claim 12 further wherein said filter mounting system receiving portion has a groove with a surface defining a first portion with a first dimension and a surface defining a second portion with a second dimension less than the first dimension.

16. The gasket of claim 12 wherein said tapered surface of said filter mounting system receiving portion is engagable with a portion of the filter mounting system to pivot and force said tubesheet receiving portion into sealing engagement with a surface of the tubesheet adjacent an opening in the tubesheet.

17. The gasket of claim 12 wherein said gasket is made from a material that has a hardness in the range of 30–65 Shore A.

18. The gasket of claim 12 wherein said filter mounting system receiving portion has an opening with a dimension that increases upon installation of a portion of the filter mounting system to effect a seal therebetween.

19. A filter cartridge mounting system for use in a baghouse having a tubesheet with a plurality of openings, said filter mounting system comprising:
  a filter cartridge including:
    pleated filter media;
    structure for supporting said filter media;
    a rigid non-metallic tubular mounting collar integrally formed with said filter media and said supporting structure to secure said filter media and said supporting structure to said collar, said mounting collar having a tapered surface portion extending from a tubular portion; and
  a gasket made of a flexible elastomeric material, said gasket having a tubesheet receiving portion and a filter receiving portion axially spaced from said tubesheet receiving portion, said filter receiving portion having a tapered surface portion;
  said tubular portion of said mounting collar adapted to be positioned within said gasket and engaging said filter receiving portion to effect sealing engagement of said tubesheet receiving portion of said gasket against a portion of the tubesheet; and
  said filter receiving portion is tapered to force a portion of said tubesheet receiving portion of said gasket so a first sealing portion of said tubesheet receiving portion engages another portion of the tubesheet upon engagement with said tapered surface portion of said mounting collar during installation of said filter assembly in said gasket.

20. The filter cartridge mounting system of claim 19 wherein a second sealing portion of said tubesheet receiving portion is adapted to be located on a side of the tubesheet opposite said filter receiving portion and said first sealing portion to effect sealing engagement with a surface of the tubesheet adjacent the opening in the tubesheet.

21. The filter mounting system of claim 19 further including an annular surface extending from said mounting collar for establishing the position of said filter cartridge relative to the tubesheet and sealing engagement of another portion of said gasket with another surface of the tubesheet.

22. The filter mounting system of claim 19 further including an annular ridge extending from said mounting collar for establishing sealing engagement with said filter receiving portion of said gasket.

23. The filter mounting system of claim 19 wherein the hardness of said gasket is less than the hardness of said mounting collar.

24. The filter mounting system of claim 23 wherein said filter receiving portion of said gasket is made from a conformable material having a hardness in the range of about 30 to 65 Shore A.

25. The filter mounting system of claim 23 wherein said mounting collar is made from a rigid non-metallic material having a hardness in the range of about 50 Shore A to 85 Shore D.

26. The filter mounting system of claim 19 further including a projection extending from one of said mounting collar and said gasket and a receiving area formed in the other of said gasket and said mounting collar, said projection receivable within the receiving area and engagable with a surface defining the receiving area to locate and secure said mounting collar relative to said gasket and form a seal therebetween.

27. The filter mounting system of claim 19 further including a first filter receiving portion having a first inner dimension and a second fitter receiving portion having a second inner dimension, the first inner dimension being less than the second inner dimension.

28. The filter mounting system of claim 19 wherein said tubesheet receiving portion includes a pair of axially spaced tubular surfaces and said mounting collar includes a pair of axially spaced continuous circumferential projections, said mounting collar adapted to be positioned within said tubesheet receiving portion of said gasket and said projections engaging a respective one of said tubular surfaces to force portions of said gasket against two surfaces of the tubesheet adjacent the opening to effect sealing engagement therebetween.

29. A filter mounting system for use in a baghouse having a tubesheet with a plurality of openings, said filter mounting system comprising:

a filter assembly including:
 filter media; and
 a rigid non-metallic tubular mounting collar attached to said filter media to mount said filter media relative to the tubesheet, said mounting collar having a tapered surface portion;

a gasket made of a flexible elastomeric material, said gasket having a tubesheet receiving portion and a filter receiving portion extending from said tubesheet receiving portion, said tubesheet receiving portion having a pair of axially spaced tubular surfaces and a tapered surface portion that forces a first portion of said tubesheet receiving portion of said gasket into engagement with a first portion of the tubesheet upon engagement with said tapered surface portion of said mounting collar during installation of said filter assembly in said gasket;

said mounting collar including a pair of axially spaced projections extending from said collar, said mounting collar adapted to be positioned within said tubesheet receiving portion of said gasket and each of said projections engaging a respective one of said tubular surfaces to force portions of said gasket against surfaces of the tubesheet adjacent the opening to effect sealing engagement therebetween, said mounting collar also adapted to be positioned within said filter receiving portion of said gasket and engage said filter receiving portion to effect sealing engagement of said tubesheet receiving portion of said gasket against another portion of the tubesheet adjacent the opening, said filter receiving portion extending from said tubesheet receiving portion to force one portion of said gasket into sealing engagement with a surface of the tubesheet upon engagement with said mounting collar.

30. The filter mounting system of claim 29 wherein said mounting collar further includes an annular surface extending from said mounting collar for establishing the position of said filter relative to the tubesheet.

31. The filter mounting system of claim 29 wherein the hardness of said gasket is less than the hardness of said mounting collar.

32. The filter mounting system of claim 31 wherein said filter receiving portion of said gasket is made from a conformable material having a hardness in the range of about 30 to 65 Shore A.

33. The filter mounting system of claim 31 wherein said mounting collar is made from a rigid non-metallic material having a hardness in the range of about 50 Shore A to 85 Shore D.

* * * * *

US007186284C1

(12) INTER PARTES REEXAMINATION CERTIFICATE (847th)
United States Patent
Clements

(10) Number: US 7,186,284 C1
(45) Certificate Issued: *Mar. 21, 2014

(54) FILTER MOUNTING SYSTEM

(75) Inventor: Jack Thomas Clements, Lee's Summit, MO (US)

(73) Assignee: BHA Altair, LLC, Franklin, TN (US)

Reexamination Request:
No. 95/000,646, Oct. 18, 2011

Reexamination Certificate for:
Patent No.: 7,186,284
Issued: Mar. 6, 2007
Appl. No.: 10/778,487
Filed: Feb. 13, 2004

(*) Notice: This patent is subject to a terminal disclaimer.

(51) Int. Cl.
*B01D 29/17* (2006.01)
*B01D 46/00* (2006.01)
*B01D 46/24* (2006.01)
*B01D 46/52* (2006.01)

(52) U.S. Cl.
CPC ........ *B01D 46/0005* (2013.01); *B01D 46/2407* (2013.01); *B01D 46/521* (2013.01); *B01D 2265/024* (2013.01); *B01D 2271/02* (2013.01); *Y10S 55/26* (2013.01)
USPC ................ 55/377; 55/341.1; 55/374; 55/376; 55/378; 55/508; 55/509; 55/DIG. 26; 95/273

(58) Field of Classification Search
None
See application file for complete search history.

(56) References Cited

To view the complete listing of prior art documents cited during the proceeding for Reexamination Control Number 95/000,646, please refer to the USPTO's public Patent Application Information Retrieval (PAIR) system under the Display References tab.

*Primary Examiner* — Terrence Till

(57) ABSTRACT

A filter mounting system for use in a baghouse having a tubesheet with a plurality of openings. The filter mounting system includes filter media and a tubular mounting collar attached to the filter media to mount the filter media relative to the tubesheet. The filter mounting system also includes a gasket made of a flexible material. The gasket has a tubesheet receiving portion and a filter receiving portion extending from the tubesheet receiving portion. The mounting collar of the filter mounting system is adapted to be positioned within the filter receiving portion of the gasket and engaging the filter receiving portion to effect sealing engagement of the tubesheet receiving portion of the gasket against a portion of the tubesheet adjacent the opening. The filter receiving portion extends from the tubesheet receiving portion to force one portion of the gasket into sealing engagement with a surface of the tubesheet upon engagement with the mounting collar.

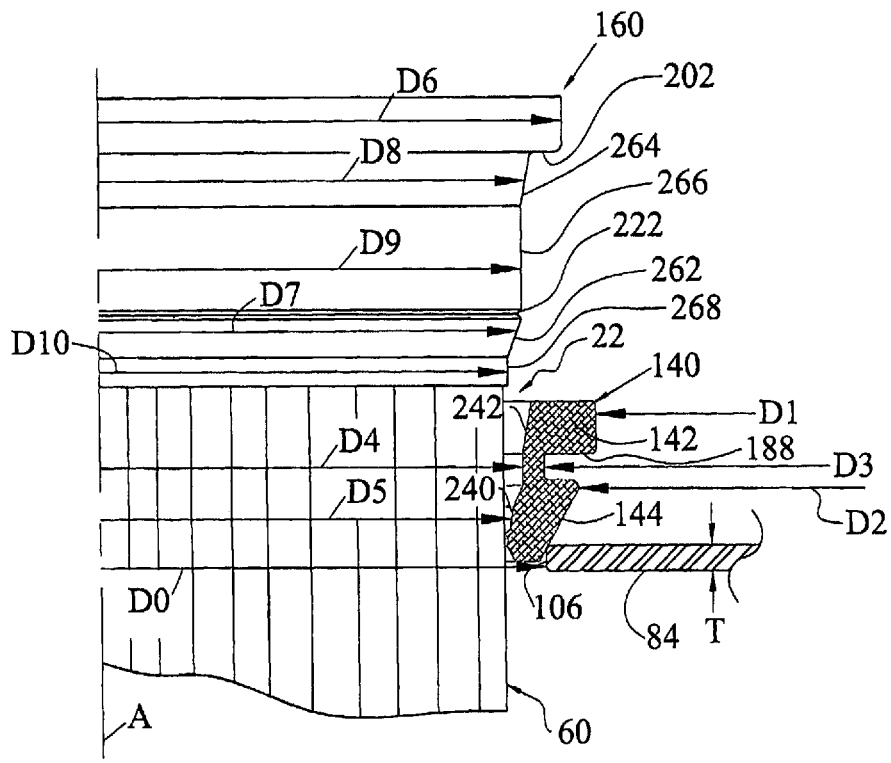

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 12, 15, 16 and 18 are determined to be patentable as amended.

Claims 13, 14 and 17, dependent on an amended claim, are determined to be patentable.

New claims 34-41 are added and determined to be patentable.

Claims 1-11 and 19-33 were not reexamined.

12. A gasket for mounting a filter assembly in a baghouse that has a tubesheet with a plurality of openings, said gasket made of a flexible elastomeric material and having a tubesheet receiving portion and a filter assembly receiving portion extending from said tubesheet receiving portion, said *filter assembly* receiving portion having a tapered surface for engaging a *first* portion of the filter assembly to effect a seal with the filter assembly and the tubesheet, *and said tubesheet receiving portion having a tapered surface for engaging a second portion of the filter assembly to effect a seal with the filter assembly and the tubesheet.*

15. The gasket of claim 12 further wherein said filter [mounting system] *assembly* receiving portion has a groove with a surface defining a first portion with a first dimension and a surface defining a second portion with a second dimension less than the first dimension.

16. The gasket of claim 12 wherein said tapered surface of said filter [mounting system] *assembly* receiving portion is engagable with [a] *the first* portion of the filter [mounting system] *assembly* to pivot and force said tubesheet receiving portion into sealing engagement with a surface of the tubesheet adjacent an opening in the tubesheet.

18. The gasket of claim 12 wherein said filter [mounting system] *assembly* receiving portion has an opening with a dimension that increases upon installation of a portion of the filter [mounting system] *assembly* to effect a seal therebetween.

*34. The gasket of claim 12, wherein the tapered surface of the tubesheet receiving portion comprises a minimum inner diameter (D4), wherein the tapered surface of the filter receiving portion comprises a minimum inner diameter (D5), and wherein diameter (D5) is less than diameter (D4).*

*35. The gasket of claim 12, wherein the tapered surface of the filter assembly receiving portion has a minimum diameter that is different from a minimum diameter of the tapered surface of the tubesheet receiving portion.*

*36. The gasket of claim 12, wherein the tapered surface of the filter assembly receiving portion is a tapered inner surface, and wherein the tapered surface of the tubesheet receiving portion is a tapered inner surface.*

*37. A gasket for mounting a filter assembly in a baghouse that has a tubesheet with a plurality of openings, said gasket made of a flexible elastomeric material and having a tubesheet receiving portion and a filter receiving portion extending from said tubesheet receiving portion, wherein said tubesheet receiving portion having a tapered surface for engaging a portion of the filter assembly to effect a seal with the filter assembly and the tubesheet, and wherein said filter receiving portion having a tapered surface for engaging a portion of the filter assembly to effect a seal with the filter assembly and the tubesheet.*

*38. The gasket of claim 37, wherein the tapered surface of the tubesheet receiving portion comprises a minimum inner diameter (D4), wherein the tapered surface of the filter receiving portion comprises a minimum inner diameter (D5), and wherein diameter (D5) is less than diameter (D4).*

*39. The gasket of claim 37, wherein the tapered surface of the filter receiving portion has a minimum diameter that is different from a minimum diameter of the tapered surface of the tubesheet receiving portion.*

*40. The gasket of claim 37, wherein the tapered surface of the filter assembly receiving portion is a tapered inner surface, and wherein the tapered surface of the tubesheet receiving portion is a tapered inner surface.*

*41. A filter mounting system for use in a baghouse having a tubesheet with a plurality of openings, said filter mounting system comprising;*

*a filter assembly including:*
*filter media; and*
*a rigid non-metallic tubular mounting collar attached to said filter media to mount said filter media relative to the tubesheet, said mounting collar having:*
*a first tapered surface portion, and*
*a second tapered surface portion, both first and second tapered surface portions extending from a tubular portion;*
*a gasket made of a flexible elastomeric material, said gasket having:*
*a tubesheet receiving portion, said tubesheet receiving portion having a tapered surface portion that forces a first portion of said tubesheet receiving portion of said gasket into engagement with a first portion of the tubesheet upon engagement with said first tapered surface portion of said mounting collar during installation of said filter assembly in said gasket, and*
*a filter receiving portion extending from said tubesheet receiving portion, said filter receiving portion having a tapered surface portion that forces a second portion of said tubesheet receiving portion of said gasket into engagement with a second portion of the tubesheet upon engagement with said second tapered surface portion of said mounting collar during installation of said filter assembly in said gasket;*
*said tubular portion of said mounting collar of said filter assembly adapted to be positioned within said filter receiving portion of said gasket and engaging said filter receiving portion to effect sealing engagement of the second portion of said tubesheet receiving portion of said gasket against the second portion of the tubesheet.*

\* \* \* \* \*